United States Patent
Jia et al.

(10) Patent No.: US 11,275,655 B1
(45) Date of Patent: Mar. 15, 2022

(54) METHOD, ELECTRONIC DEVICE, AND COMPUTER PROGRAM PRODUCT FOR SELECTING BACKUP DESTINATION

(71) Applicant: EMC IP Holding Company LLC, Hopkinton, MA (US)

(72) Inventors: Zhen Jia, Shanghai (CN); Qi Wang, Shanghai (CN); Yun Zhang, Shanghai (CN); Ren Wang, Shanghai (CN); Jing Yu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/072,702

(22) Filed: Oct. 16, 2020

(30) Foreign Application Priority Data

Sep. 16, 2020 (CN) .......................... 202010972953.X

(51) Int. Cl.
*G06F 11/14* (2006.01)

(52) U.S. Cl.
CPC .... *G06F 11/1461* (2013.01); *G06F 2201/805* (2013.01)

(58) Field of Classification Search
CPC ............... G06F 11/1461; G06F 2201/805
USPC ............................................. 707/654
See application file for complete search history.

(56) References Cited

U.S. PATENT DOCUMENTS

| | | | | |
|---|---|---|---|---|
| 10,606,709 | B1 * | 3/2020 | Bansal | G06F 9/5072 |
| 2017/0192855 | A1 * | 7/2017 | Lefebvre | G06F 11/1458 |
| 2018/0059946 | A1 * | 3/2018 | Kunii | G06F 3/0604 |

OTHER PUBLICATIONS

Wikipedia, "Convolutional Neural Network," "https://en.wikipedia.org/w/index.php?title=Convolutional_neural_network&oldid=967318445", Jul. 12, 2020, 29 pages.
Wikipedia, "Feature Engineering," https://en.wikipedia.org/w/index.php?title=Feature_engineering&oldid=948384435, Mar. 31, 2020, 5 pages.
Wikipedia, "Long Short-term Memory," https://en.wikipedia.org/w/index.php?title=Long_short-term_memory&oldid=965461224, Jul. 1, 2020, 13 pages.

* cited by examiner

*Primary Examiner* — Yair Leibovich
(74) *Attorney, Agent, or Firm* — Ryan, Mason & Lewis, LLP

(57) ABSTRACT

Implementations of the present disclosure provide a method, an electronic device, and a computer program product for selecting a backup destination. One method includes: receiving device information about storage devices in a storage device set, wherein a backup task is executed in the storage device set; receiving backup information about the backup task; acquiring a destination association relationship, wherein the destination association relationship describes an association relationship between a reference backup task in a reference storage device set and a reference backup destination of the reference backup task, the reference backup destination including a group of storage devices in a reference storage system; and selecting a backup destination for the backup task from the storage device set according to the destination association relationship and based on the device information and the backup information, the backup destination including a group of storage devices in the storage device set.

20 Claims, 11 Drawing Sheets

METHOD, ELECTRONIC DEVICE, AND COMPUTER PROGRAM PRODUCT FOR SELECTING BACKUP DESTINATION

RELATED APPLICATION(S)

The present application claims priority to Chinese Patent Application No. 202010972953.X, filed Sep. 16, 2020, and entitled "Method, Electronic Device, and Computer Program Product for Selecting Backup Destination," which is incorporated by reference herein in its entirety.

FIELD

The implementations of the present disclosure generally relate to storage systems, and more particularly to a method, an electronic device, and a computer program product for selecting a storage device as a backup destination.

BACKGROUND

Many companies or enterprises generate large amounts of data every day. For security of data, data protection becomes more and more important. In this regard, a backup storage system can provide data protection so as to copy data to be backed up to one or more storage devices, thereby obtaining one or more data copies stored in different storage devices.

At present, it has been proposed to select a storage device subset that can be used as backup destinations based on states of multiple optional storage devices in a storage device set. For example, a score can be set for the state of each storage device in the storage device set, and various combination modes (for example, the modes based on permutation and combination) for generating a storage device subset can be determined. However, when there is a large number (for example, dozens or more) of storage devices, there will be tens or even hundreds of thousands of combination modes based on the number of backup copies. At this moment, when a backup destination is selected, a huge amount of computation will be involved, and therefore, it is impossible to provide users with recommendations for backup destinations in an effective manner.

SUMMARY

Implementations of the present disclosure provide a technical solution for determining, in a storage device set, a storage device subset for data backup, and specifically provide a method, an electronic device, and a computer program product for storage management.

In a first aspect of the present disclosure, a method for selecting a backup destination for a backup task is provided. This method includes: receiving device information about storage devices in a storage device set, wherein the backup task is executed in the storage device set; receiving backup information about the backup task; acquiring a destination association relationship, wherein the destination association relationship describes an association relationship between a reference backup task in a reference storage device set and a reference backup destination of the reference backup task, the reference backup destination including a group of storage devices in a reference storage system; and selecting a backup destination for the backup task from the storage device set according to the destination association relationship and based on the device information and the backup information, the backup destination including a group of storage devices in the storage device set.

In a second aspect of the present disclosure, an electronic device is provided, including: at least one processor; and at least one memory storing computer program instructions, wherein the at least one memory and the computer program instructions are configured to cause, together with the at least one processor, the electronic device to perform an action for selecting a backup destination for a backup task. The action includes: receiving device information about storage devices in a storage device set, wherein the backup task is executed in the storage device set; receiving backup information about the backup task; acquiring a destination association relationship, wherein the destination association relationship describes an association relationship between a reference backup task in a reference storage device set and a reference backup destination of the reference backup task, the reference backup destination including a group of storage devices in a reference storage system; and selecting a backup destination for the backup task from the storage device set according to the destination association relationship and based on the device information and the backup information, the backup destination including a group of storage devices in the storage device set.

In a third aspect of the present disclosure, a computer program product is provided. The computer program product is tangibly stored on a non-volatile computer-readable medium and includes machine-executable instructions. The machine-executable instructions, when executed, cause a machine to execute steps of the method according to the first aspect.

It should be understood that the content described in this Summary is neither intended to limit key or essential features of the implementations of the present disclosure nor intended to limit the scope of the present disclosure. Other features of the present disclosure will become readily understandable through the following description.

BRIEF DESCRIPTION OF THE DRAWINGS

The above and other objectives, features, and advantages of the implementations of the present disclosure will become readily understandable by reading the following detailed description with reference to the accompanying drawings. In the accompanying drawings, several implementations of the present disclosure are shown by way of example and not limitation.

Throughout all the accompanying drawings, the same or similar reference numerals are used to indicate the same or similar components.

DETAILED DESCRIPTION

The principles and spirit of the present disclosure will be described below with reference to several example implementations shown in the accompanying drawings. It should be understood that these implementations are described only for enabling a person skilled in the art to better understand and then implement the present disclosure, instead of limiting the scope of the present disclosure in any way. In the description and claims herein, unless otherwise defined, all technical and scientific terms used herein have meanings that are commonly understood by those of ordinary skill in the art to which the present disclosure belongs.

Figure 1:
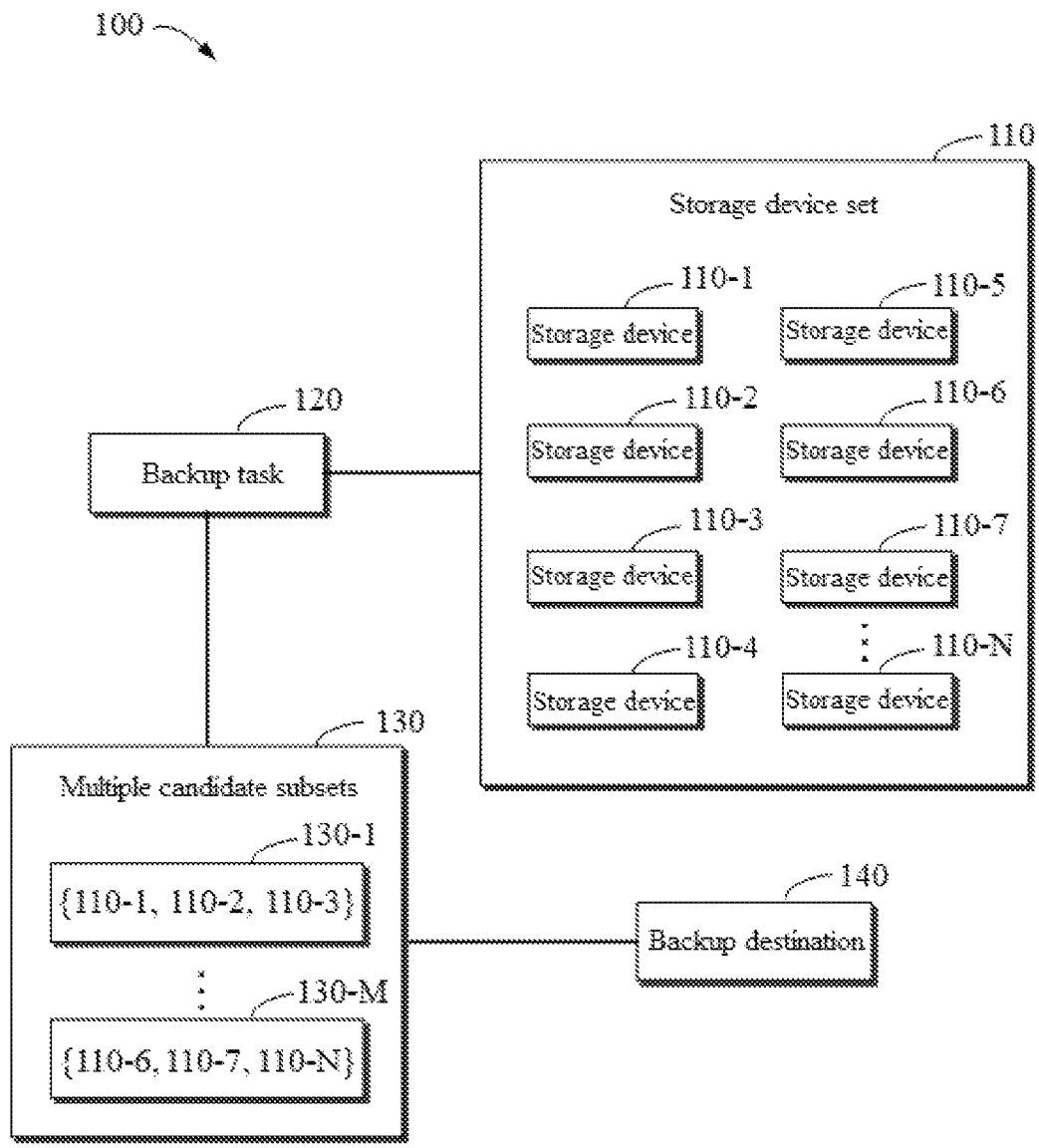
FIG. 1 schematically shows a block diagram of an example application environment in which example implementations of the present disclosure can be implemented.

At present, the concept of a distributed storage system has been proposed, and a distributed storage system may include hundreds or even more storage devices. For example, these storage devices can be distributed all over the world. Firstly, an application environment for example implementations of the present disclosure will be described with reference to FIG. 1. FIG. 1 schematically shows block diagram 100 of an example application environment in which example implementations of the present disclosure can be implemented. The storage system as shown in FIG. 1 may include storage device set 110, which may include N storage devices, such as those as shown with reference numerals 110-1, 110-2, 110-3, 110-4, 110-5, 110-6, 110-7, . . . , and 110-N.

Backup task 120 may specify the number of backup copies. For example, it may specify that 3 backup copies are required. The number of copies can be input by the user of the storage system, and the user can specify the number of copies in a service level agreement (SLA). For the convenience of description, hereinafter, the number of copies of 3 will be taken as an example for description. It should be understood that the implementations of the present disclosure can be applied to any other number of copies.

At this moment, 3 storage devices need to be selected from the N storage devices as the backup destinations. There may be multiple candidate subsets 130, and each candidate subset includes 3 storage devices. For example, candidate subset 130-1 may include storage devices 110-1, 110-2, and 110-3, . . . , and candidate subset 130-M may include storage devices 110-6, 110-7, and 110-N. Backup destination 140 may be selected from the multiple candidate subsets 130 so as to be used as the backup destination of backup task 120.

At present, it has been proposed to select a group of storage devices that can be used as backup destinations based on the states of multiple optional storage devices in the storage device set. For example, a score can be set for the state of each storage device in the storage device set, and the scores of various combination modes (for example, the modes based on permutation and combination) of generating a candidate subset of storage devices can be determined. However, when there is a large number (for example, dozens of or more) of storage devices, there will be tens or even hundreds of thousands of combination modes based on the number of backup copies. Assuming that there are N storage devices and X copies are expected to be stored, there can be $C_N^X$ combination modes. For example, if N=1000 and X=3, the number of combination modes is 1000×999×998/3×2×1=166167000. At this moment, when selecting a backup destination from a large number of combination modes, a huge amount of computation will be involved.

In view of the foregoing problems and other potential problems in the conventional solutions, the implementations of the present disclosure provide a technical solution for selecting a backup destination for a backup task from a storage device set. In the implementations of the present disclosure, a destination association relationship can be created based on the operation history of the current storage system or other similar storage systems. Then, when a backup task needs to be performed in the storage system, the current information about the storage system can be collected, and this current information can be input into the destination association relationship, so as to obtain a storage device that can be used as a backup destination.

Figure 2:
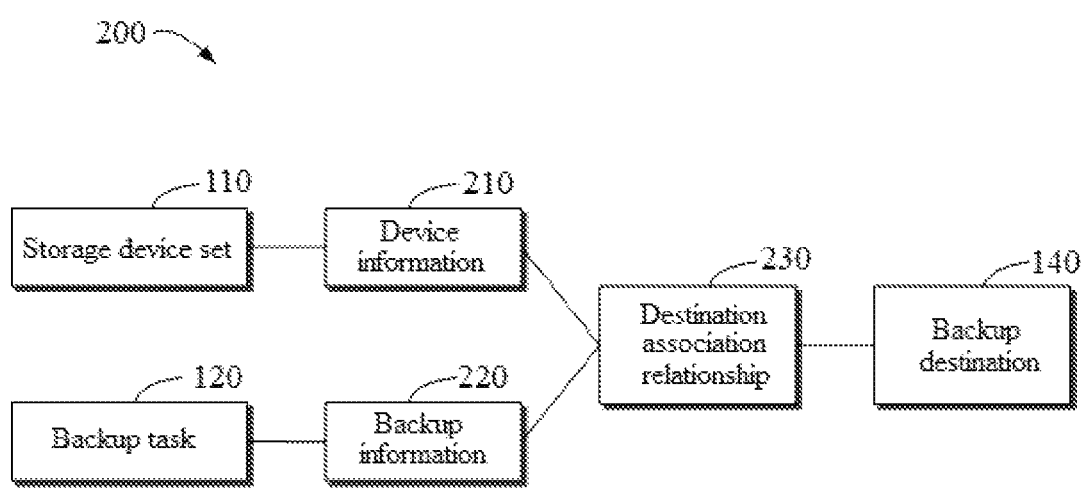
FIG. 2 schematically shows a block diagram of a process for selecting a backup destination according to an example implementation of the present disclosure.

Hereinafter, an overview of an example implementation 200 according to the present disclosure will be described with reference to FIG. 2. As shown in FIG. 2, device information 210 about storage devices in storage device set 110 is received, and backup information 220 about backup task 120 is received. Backup destination 140 is selected for backup task 120 from storage device set 110 according to destination association relationship 230 and based on device information 210 and backup information 220. According to an example implementation of the present disclosure, destination association relationship 230 here may be obtained based on historical operation state information about the storage system, or may be obtained based on historical operation state information about other storage systems similar to the current storage system.

With the example implementation 200 of the present disclosure, destination association relationship 230 can be established directly based on historical experience that has been verified as valid. In this way, it is not necessary to determine the score for each combination mode one by one, but instead, the current device information 210 and backup information 220 are directly input into destination association relationship 230 to obtain one or more backup destinations. In this way, the computing resource and time overheads in the process of selecting the backup destination can be greatly reduced, and the backup destination can be determined in a faster and more effective manner.

Figure 3:
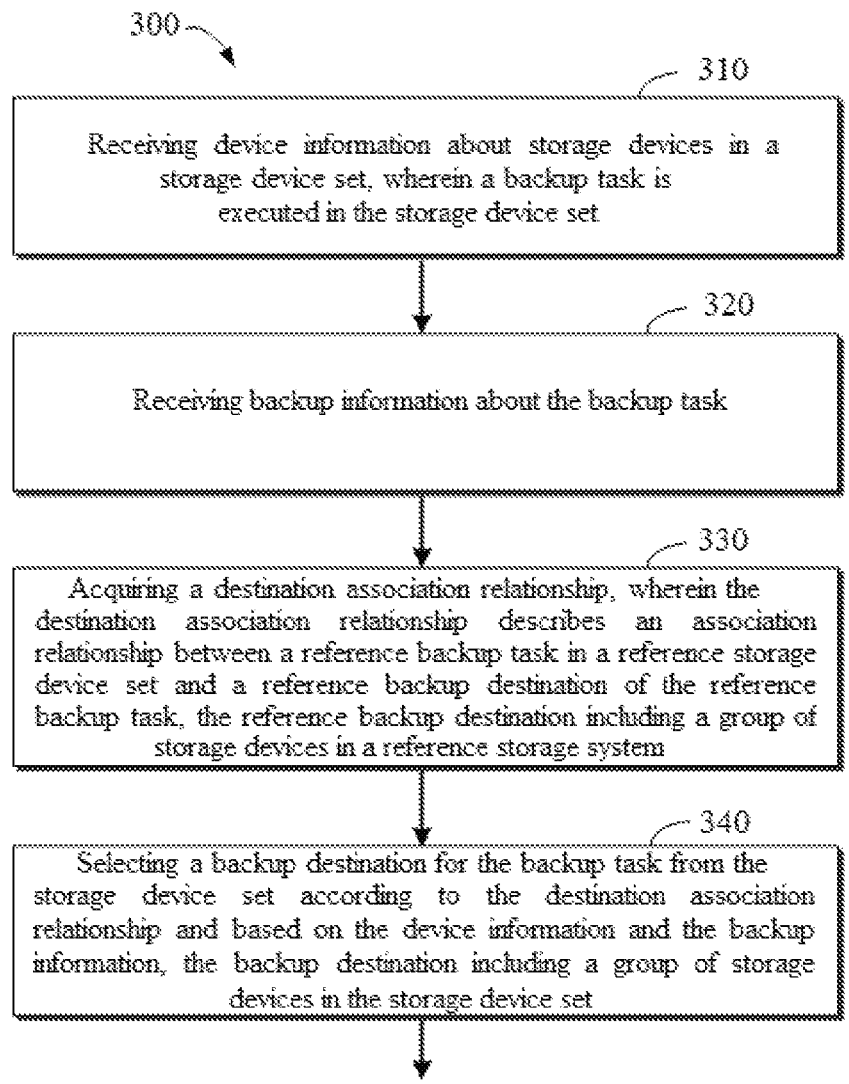
FIG. 3 schematically shows a flowchart of a method for selecting a backup destination according to an example implementation of the present disclosure.

Hereinafter, more details of an example implementation according to the present disclosure will be described with reference to FIG. 3. FIG. 3 schematically shows a flowchart of method 300 for selecting a backup destination according to an example implementation of the present disclosure. At block 310, device information 210 about storage devices in storage device set 110 is received. Here, backup task 120 is executed in storage device set 110. It will be understood that storage device set 110 includes a large number of storage devices, and device information 210 at this moment may include information about each storage device in storage device set 110.

Figure 4A:
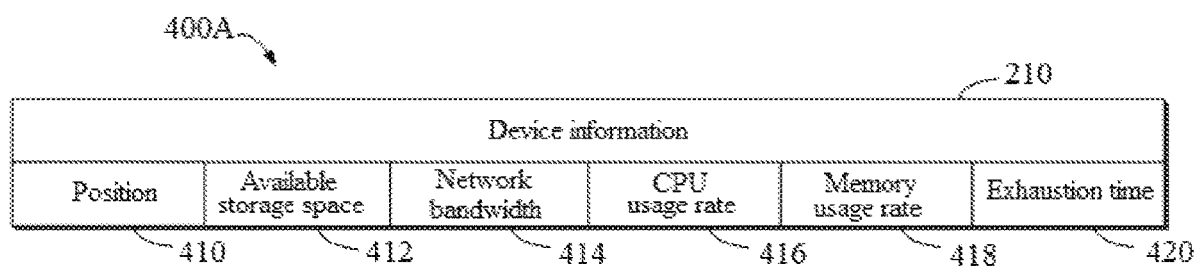
FIG. 4A schematically shows a block diagram of a data structure of device information according to an example implementation of the present disclosure.

Device information 210 may include various aspects of contents. Hereinafter, more details about device information 210 will be described with reference to FIG. 4A. FIG. 4A schematically shows block diagram 400A of a data structure of device information 210 according to an example implementation of the present disclosure. As shown in FIG. 4A, device information 210 may include at least any one of the following: position 410 of the storage device, available storage space 412 of the storage device, network bandwidth 414 of the storage device, CPU usage rate 416 of the storage device, memory usage rate 418 of the storage device, exhaustion time 420 of the storage device, and so on.

In the context of the present disclosure, position 410 may be represented by the longitude and latitude or other coordinate information of the place where the storage device is located. Available storage space 412 represents the remaining storage space in the storage device. For example, it may be represented with the size (GB) of the available storage space. Alternatively and/or additionally, it may be represented with the percentage of the available storage space. Network bandwidth 414 of the storage device refers to the available bandwidth of the storage device, and this bandwidth may vary with the size of the data transmission load of the storage device. CPU usage rate 416 and the memory usage rate 418 of the storage device respectively represent the absolute value or percentage of the CPU and memory in the storage device that have been used. Exhaustion time 420 refers to how long until available storage space 412 in the storage device will be exhausted. Exhaustion time 420 may be determined based on the speed of data transmission to the storage device and available storage space 412.

It will be understood that FIG. 4A only schematically shows an example of information related to the storage device. According to an example implementation of the present disclosure, device information 210 may include other information about the storage device, for example, the type of storage medium of the storage device (for example, a solid-state storage device or a conventional hard disk device). With the example implementation of the present disclosure, the device information about each storage device in storage device set 110 can be counted. In this way, various aspects of information about each of the storage devices can be fully considered in order to select a suitable backup destination.

Figure 4B:
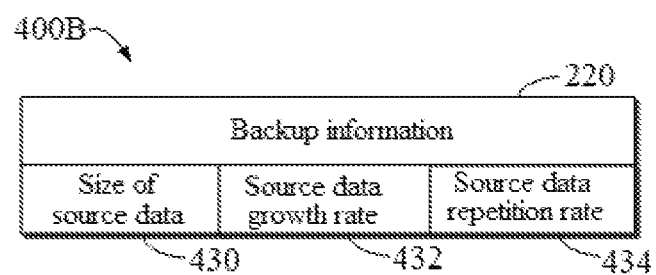
FIG. 4B schematically shows a block diagram of a data structure of backup information according to an example implementation of the present disclosure.

Returning to FIG. 3, at block 320 of FIG. 3, backup information 220 about backup task 120 is received. More information about backup information 220 will be described with reference to FIG. 4B. FIG. 4B schematically shows block diagram 400B of a data structure of backup information 220 according to an example implementation of the present disclosure. As shown in FIG. 4B, backup information 220 may include the size of source data 430, indicating the size of the source data to be backed up as specified by backup task 120. It will be understood that the source data will generally become larger and larger, so backup information 220 may include source data growth rate 432, which is used to indicate the percentage (for example, 5%) or absolute value of the daily growth of the source data. Further, the source data will usually not be completely changed, but instead, the source data of two consecutive backups will have a certain degree of duplication. Therefore, backup information 220 may include source data repetition rate 434, which is used to indicate the repetition rate (for example, 50%) of the source data of two consecutive backups.

It will be understood that FIG. 4B only schematically shows an example of backup information 220 related to backup task 120. According to an example implementation of the present disclosure, backup information 220 may include other information about the backup task, for example, the transmission time taken to back up the source data to a certain storage device, and so on. The transmission time can be determined based on the available bandwidth of the storage device and the size of source data 430. With the example implementation of the present disclosure, backup information 220 about backup task 120 to be executed can be counted. Furthermore, information about various aspects of backup task 120 can be fully considered, so as to select a backup destination suitable for backup task 120 from storage device set 110.

Figure 4C:
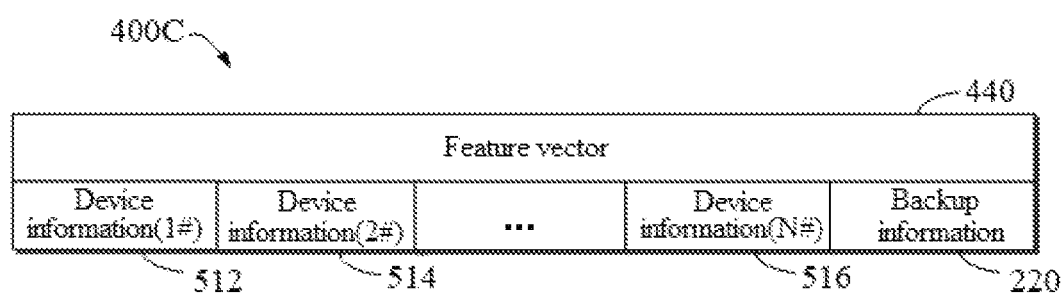
FIG. 4C schematically shows a block diagram of a data structure of a feature vector according to an example implementation of the present disclosure.

The specific contents of device information 210 and backup information 220 have been described above with reference to FIGS. 4A and 4B. Further, a feature vector representing an overall state associated with the execution of backup task 120 in the storage system may be generated based on device information 210 and backup information 220. Hereinafter, more details about the feature vector will be described with reference to FIG. 4C. FIG. 4C schematically shows block diagram 400C of a data structure of feature vector 440 according to an example implementation of the present disclosure.

As shown in FIG. 4C, feature vector 440 may include device information about each storage device: backup information 512 about a first storage device, backup information 514 about a second storage device, . . . , and backup information 516 about an Nth storage device. Further, this feature vector 440 may include backup information 220 about backup task 120. According to an example implementation of the present disclosure, a multidimensional vector can be used to represent feature vector 440.

How to acquire destination association relationship 230 will be described by returning to FIG. 3. At block 330, destination association relationship 230 is acquired. Destination association relationship 230 here may be a network model obtained based on machine learning technology, wherein this network model may describe an association relationship between a reference backup task in a reference storage device set and a reference backup destination of the reference backup task, the reference backup destination including a group of storage devices in a reference storage system. At block 340, a backup destination is selected for the backup task from the storage device set according to the destination association relationship and based on the device information and the backup information, the backup destination including a group of storage devices in the storage device set.

According to an example implementation of the present disclosure, the reference storage device set may be the storage device set in the current storage system. For example, destination association relationship 230 may be obtained based on the operation history data of the current storage system. Assume that the storage device set includes 1000 storage devices, and 500 backup tasks have been performed during the operation of the storage system. At this moment, training samples can be generated using feature vectors and historical backup destinations related to the execution of the 500 historical backup tasks, so as to obtain the association relationship between the backup destinations and the backup environment.

Specifically, feature vector 440 as shown in FIG. 4C can be generated for each historical backup task based on the manner described above, and the historical backup destination of each historical backup task can be acquired. It will be understood that there is no limitation on how to acquire the historical backup destination. According to an example implementation of the present disclosure, the historical backup destination can be selected based on manual operations of an administrator of the storage system. For another example, the historical backup destination can be selected based on a usage balance degree of each storage device.

Further, this destination association relationship 230 may be obtained based on feature vector 440 and the historical backup destination. According to an example implementation of the present disclosure, training operations can be performed based on various technologies currently known and/or to be developed in the future. According to an example implementation of the present disclosure, destination association relationship 230 can be obtained based on the convolutional neural network.

According to an example implementation of the present disclosure, reference backup information about a group of reference backup tasks in a reference storage device set can be determined. According to the format shown in FIG. 4C above, a group of training samples can be generated based on the reference backup information about the group of reference backup tasks and reference device information about each reference storage device. Further, the reference device information about each reference storage device in the reference storage device set can be determined, and destination association relationship 230 can be obtained based on the group of training samples and reference backup destinations of the group of reference backup tasks.

Figure 5:
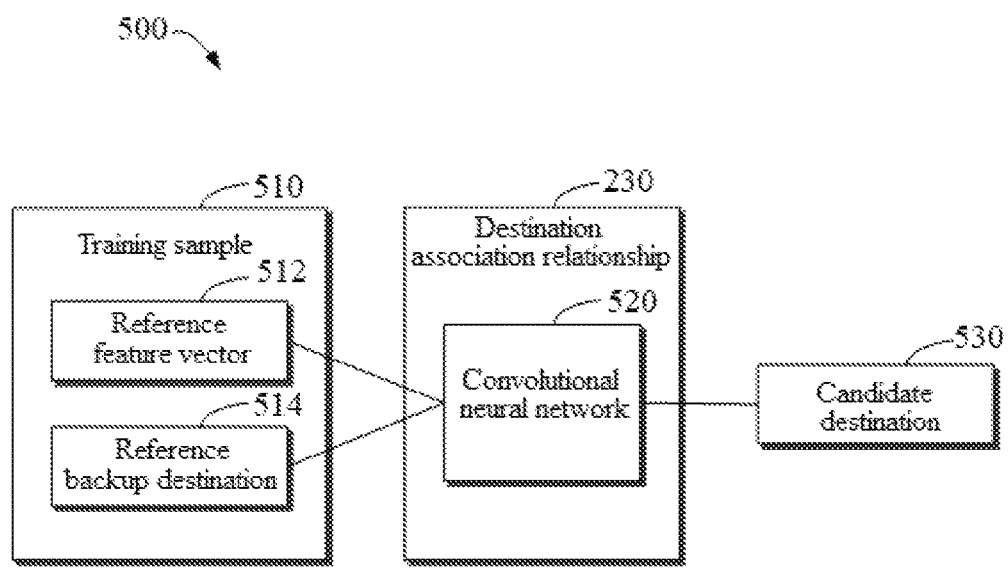
FIG. 5 schematically shows a block diagram of acquiring a destination association relationship based on a feature vector according to an example implementation of the present disclosure.

FIG. 5 schematically shows block diagram 500 of acquiring destination association relationship 230 based on a feature vector according to an example implementation of the present disclosure. As shown in FIG. 5, one training sample 510 may be generated for one historical backup task, and this training sample 510 may include reference feature vector 512 and reference backup destination 514. Specifically, the device information about each storage device and the backup information about the historical backup task may be received based on the method described above, so as to generate reference feature vector 512. Further, the backup destination of the historical backup task can be acquired to serve as reference backup destination 514. A similar operation can be performed for each historical backup task, so as to obtain a training sample corresponding to each historical backup task. With the example implementation of the present disclosure, based on past historical operations, a wealth of training samples can be obtained. The training samples at this moment will include the successful experience of selecting the backup destinations, which will help to select a suitable backup destination for a future backup operation.

According to an example implementation of the present disclosure, destination association relationship 230 can be obtained in an iterative manner using the training samples. For example, this destination association relationship 230 may be realized based on convolutional neural network 520. After the training phase is completed, when reference feature vector 512 is input to the trained destination association relationship 230, backup destination 530 that is output is consistent with reference backup destination 514 in training sample 510.

According to an example implementation of the present disclosure, the training samples in the training set can be used to obtain destination association relationship 230. Test samples in a test set can be used to test whether destination association relationship 230 can obtain a correct output result. Further, destination association relationship 230 can be adjusted so that this association relationship can better match the test set.

The process of training destination association relationship 230 based on the historical data of the storage system itself has been described above. According to an example implementation of the present disclosure, destination association relationship 230 may also be obtained based on historical data of different storage systems. Assuming that there are two identical storage systems, historical data of one storage system can be used to obtain destination association relationship 230. Further, the obtained destination association relationships 230 may be used to select backup destinations in two different storage systems, respectively.

According to an example implementation of the present disclosure, the reference storage system used to provide training samples does not have to be identical to the current storage system, but instead, this reference storage system may be similar to the current storage system. For example, the reference storage device set included in the reference storage system may have a similar number of storage devices as the current storage device set. It can be set that the ratio of the numbers of storage devices in the two storage device set should satisfy a threshold range. For example, this threshold range can be represented as $[1-\Delta, 1+\Delta]$, where $\Delta$ can be set to 0.005 and/or other values. The smaller the value of $\Delta$, the more similar the numbers of storage devices in the two storage device set. At this moment, destination association relationship 230 obtained based on the historical data of the reference storage system is more suitable for the current storage system.

It will be understood that the selection of the backup destination largely depends on the configurations of the storage devices of the storage system. Therefore, the reference storage system and the current storage system should have the same or similar device configurations. For example, it can be specified that the capacity of the reference storage device in the reference storage system should be similar to the capacity of the storage device of the current storage system, and it can be specified that the type of hard disk of the reference storage device is the same as that of the storage device, and so on. In this way, it can be ensured that all aspects of the configuration of the reference storage devices in the reference storage system that are used as the training basis are similar to those of the current storage system, so that destination association relationship 230 can be more suitable for the current storage system.

It will be understood that although the use of destination association relationship 230 from the reference storage system may lead to low accuracies in some cases, this destination association relationship 230 can output a more preferred backup destination in most cases. With the example implementation of the present disclosure, it is not necessary to train destination association relationship 230 respectively for each storage system, and thus the reusability of destination association relationship 230 can be greatly improved, and the time and computing resource overheads of the training phase can be reduced.

It will be understood that the number of storage devices included in the backup destination depends on the number of copies specified by the backup task. According to an example implementation of the present disclosure, the reference backup task used as the training sample and the backup task of the current storage system should specify the same number of copies. Assuming that the backup task of the current storage system specifies that 3 copies are needed, a historical backup task specifying 3 copies can be selected to generate a training sample.

According to an example implementation of the present disclosure, the number of backup copies of the reference backup task used as the training sample may be greater than the number of copies of the backup task of the current storage system. Assuming that the backup task of the current storage system specifies that 3 copies are needed, and assuming that no backup task specifying 3 copies has been performed in the past, a historical backup task specifying 4 copies can be selected to generate a training sample. The backup destination generated at this moment will involve 4 storage devices, and 3 storage devices can be selected from the 4 storage devices to serve as the backup destinations. Although the backup destination obtained at this moment may not be optimal, compared to the existing technical solutions of determining the backup destination in a completely manual selection manner and/or for each combination mode, this technical solution can make full use of the existing experience to serve future backup tasks.

The example of acquiring device information 210 and backup information 220 for a certain point in time and generating feature vector 440 has been described above. According to an example implementation of the present disclosure, device information 210 and backup information 220 within a certain preset time period can be received. At this moment, the obtained device information 210 and backup information 220 are both represented by time sequence data.

Figure 6A:
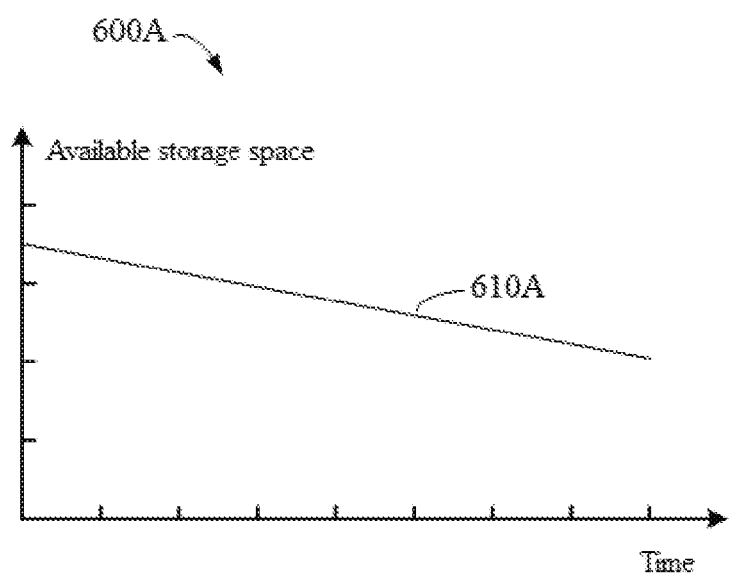
FIG. 6A is a graphical plot related to changes in available storage space according to an example implementation of the present disclosure.
Figure 6B:
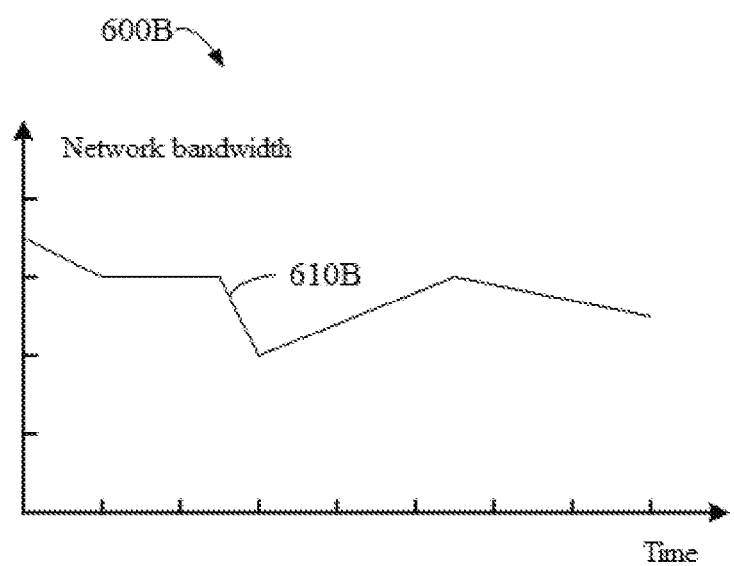
FIG. 6B is a graphical plot related to changes in network bandwidth according to an example implementation of the present disclosure.

FIG. 6A shows a graphical plot 600A related to changes in available storage space according to an example implementation of the present disclosure. In FIG. 6A, the abscissa represents time and the ordinate represents available storage space. It can be specified to obtain changes in available storage space that are within 1 hour (or other length of time). At this moment, the available storage space can be represented by a time sequence as shown by curve 610A. FIG. 6B shows a graphical plot 600B related to changes in network bandwidth according to an example implementation of the present disclosure. In FIG. 6B, the abscissa represents time and the ordinate represents network bandwidth. It can be specified to acquire changes in network bandwidth that are within 1 hour (or other length of time). At this moment, the network bandwidth can be represented by a time sequence shown by curve 610B.

Figure 7:
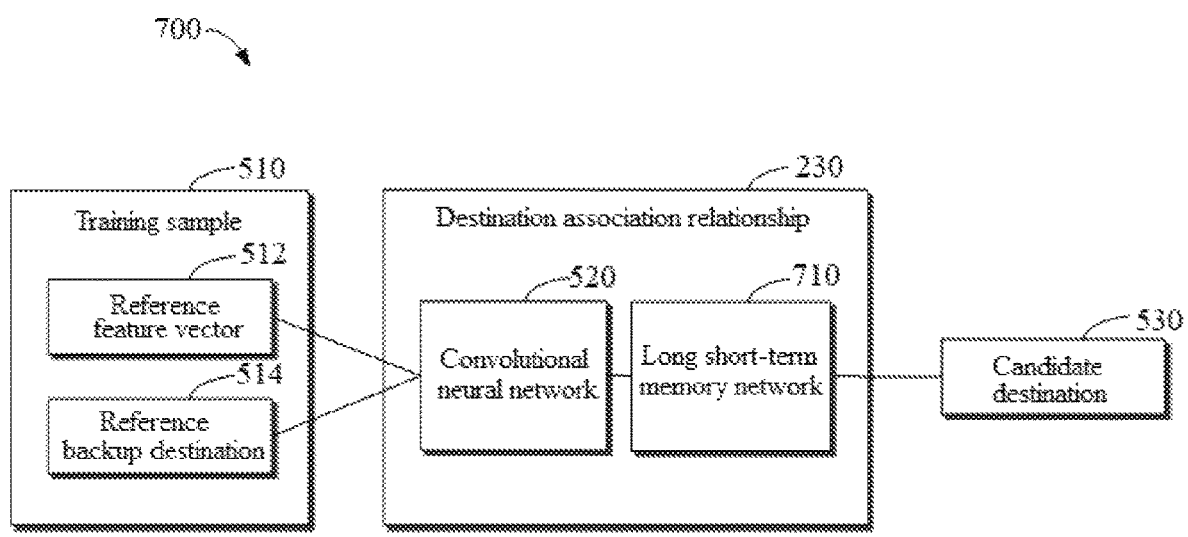
FIG. 7 schematically shows a block diagram of acquiring a destination association relationship based on a feature vector according to an example implementation of the present disclosure.

Similarly, corresponding backup information 220 may be generated based on backup tasks that are within a preset time period. At this moment, both the device information and the backup information in feature vector 440 will be represented in the form of time sequence. According to an example implementation of the present disclosure, in order to analyze the association relationship related to time sequence data in a more accurate manner, a long short-term memory network may be introduced into destination association relationship 230. Hereinafter, more details will be described with reference to FIG. 7. FIG. 7 schematically shows block diagram 700 of acquiring the destination association relationship based on a feature vector according to an example implementation of the present disclosure.

As shown in FIG. 7, destination association relationship 230 can be constructed based on convolutional neural network 520 and long short-term memory network 710. At this moment, the network model based on convolutional neural network 520 can map feature vector 512 (including the reference backup information and the reference device information) to an internal feature vector. The internal feature vector here may be a high-dimensional feature vector without physical meaning. Then, the network model based on long short-term memory network 710 can map the internal feature vector to backup destination 530.

It will be understood that although convolutional neural network 520 and long short-term memory network 710 exist at this moment, for external users, there is no need to know the internal details of destination association relationship 230, but instead, destination association relationship 230 can be used as a black box for training. That is, there is no need to train convolutional neural network 520 and long short-term memory network 710 independently, but instead, only training samples 510 are needed to enable destination association relationship 230 to receive the feature vector and output backup destination 530.

The details of the training process have been described above. After destination association relationship 230 has been obtained, a feature vector established using the device information and backup information about the current storage system can be input to this destination association relationship 230 to obtain a corresponding backup destination. At this moment, the backup destination output by destination association relationship 230 represents a group of storage devices that can be used as backup destinations. Specifically, when destination association relationship 230 as shown in FIG. 7 is used, convolutional neural network 520 can map the feature vector including the backup information and the device information to a high-dimensional internal feature vector. Then, long short-term memory network 710 can map the high-dimensional internal feature vector to the backup destination. With the example implementation of the present disclosure, convolutional neural network 520 can effectively extract various aspects of features of the storage system, and long short-term memory network 710 can fully mine the internal connections in the time sequence data. In this way, destination association relationship 230 can have a higher accuracy.

According to an example implementation of the present disclosure, multiple candidate backup destinations may be output based on destination association relationship 230. Further, the backup destination can be verified based on multiple indicators, and the multiple candidate backup destinations can be filtered based on preset performance requirements. For example, a preset performance requirement can be set based on the distance between storage devices. Specifically, the preset performance requirements may include: the distance between any two storage devices in the candidate backup destination is greater than a threshold distance (for example, 300 kilometers). Assuming that the candidate backup destination includes 3 storage devices, and the distance between any two of the devices is greater than the threshold distance, this candidate backup destination can be used as the backup destination. Otherwise, the candidate backup destination can be filtered out, and other suitable candidate backup destinations can be selected from the multiple candidate backup destinations.

It will be understood that the threshold distance can ensure that the storage devices in each candidate backup destination have different physical environments, thereby reducing the possibility of simultaneous failures (e.g., power outages, floods, mechanical shocks, etc.) of different storage devices. It will be understood that the specific value of the threshold distance listed here is only illustrative and is not intended to limit the scope of the present disclosure in any way. In other implementations, the threshold distance may be set to any value according to specific technical environments and performance requirements.

According to an example implementation of the present disclosure, it can be specified that the available resource amount of any storage device in a group of storage devices included in the candidate backup destination should be greater than a threshold resource amount. Specifically, the preset performance requirements can be set based on the available resources in the storage device. The preset performance requirements may include: an available resource amount of any storage device in the candidate backup destination is greater than a threshold resource amount. In this way, it is ensured that any candidate backup destination can complete data backup. For example, the available resource amount here may include the computing resource amount, the memory resource amount, storage capacities, network bandwidths, etc. of the storage device. According to an example implementation of the present disclosure, the threshold resource amount can be set based on the resource amount required by the backup task. In other implementations, the threshold resource amount may also be predetermined according to specific technical environment and performance requirements.

According to an example implementation of the present disclosure, it may be specified that a global balance degree associated with the candidate backup destination should be higher than a threshold balance degree. Here, the global balance degree indicates a usage balance degree of the storage device set in the situation where a storage device in the candidate backup destination is used for the backup task. It will be understood that the "usage balance degree" may refer to the balance degree of the "usage" of multiple storage devices in any aspect. For example, the "usage balance degree" may refer to the "usage balance degree" of the available storage capacity of the multiple storage devices, the "usage balance degree" of the input network bandwidth of the multiple storage devices, the "usage balance degree" of the processing resources of the multiple storage devices, the "usage balance degree" of the memory resources of the multiple storage devices, and so on.

The global balance degree of each candidate backup destination can be determined respectively, and then the final backup destination can be determined based on the global balance degree. According to an example implementation of the present disclosure, the global balance degree can be determined based on various methods. For example, the global balance degree of the candidate backup destination may be determined based on the usage metric of each storage device in the candidate backup destination and the time required to transmit backup data to each storage device in the candidate backup destination.

According to an example implementation of the present disclosure, it is expected that the usage rate of the multiple storage devices will increase uniformly, but it is not desirable that a certain storage device will be exhausted prematurely. Therefore, the usage metric can be used to measure the time when the storage device is exhausted. For example, it is possible to determine when the storage device is exhausted based on the remaining storage capacity in the storage device, the size of the source data to be backed up, and the daily growth rate of the source data. For example, the time when the ith storage device is exhausted can be determined based on the following Formula 1 and Formula 2:

$$VE_i = \sum_{s=1}^{n} \frac{SDS_s * DDl_i}{DR} \quad \text{Formula 1}$$

where $VE_i$ represents the daily data growth of the ith storage device, i is a positive integer and i≤the number of storage devices N, n represents the number of pieces of source data with backups, $SDS_S$ represents the Sth source data, $DDl_i$ represents the daily data growth (for example, represented as a percentage) of the ith storage device, and DR represents the data repetition rate.

$$ETFR_i = \frac{VE_i}{RC_i} \quad \text{Formula 2}$$

where $ETFR_i$ represents the predicted exhaustion time of the ith storage device, wherein $VE_i$ represents the daily data growth of the ith storage device, and $RC_i$ represents the available storage space on the ith storage device.

Further, the standard deviation related to the exhaustion time of each storage device can be determined based on the following Formula 3:

$$\sigma 1 = \sqrt{\frac{\sum_{i=1}^{N}(ETFR_i - \overline{ETFR})^2}{N}} \quad \text{Formula 3}$$

where σ1 represents the standard deviation related to the exhaustion time, N represents the number of storage devices, $ETFR_i$ represents the predicted exhaustion time of the ith storage device, and $\overline{ETFR}$ represents an average value of exhaustion times of all the storage devices. It will be understood that the above Formulas 1 to 3 are only specific examples for determining the component of the global balance degree, which is related to the exhaustion time. According to an example implementation of the present disclosure, this component can be determined based on other formulas.

Hereinafter, more information about determining the transmission time will be introduced. According to an example implementation of the present disclosure, the time required to transmit source data to a certain storage device can be determined based on the bandwidth of each storage device. For example, the time for transmitting the source data to the ith storage device can be determined based on the following Formula 4:

$$ETC_i = \frac{VE_i}{NB_i} \quad \text{Formula 4}$$

where $ETC_i$ represents the time for transmitting the source data to the ith storage device, $VE_i$ represents the daily data growth of the ith storage device, and $NB_i$ represents the bandwidth of the ith storage device.

The standard deviation related to the transmission time of each storage device can be further determined based on Formula 5:

$$\sigma 2 = \sqrt{\frac{\sum_{i=1}^{N}(ETC_i - \overline{ETC})^2}{N}} \quad \text{Formula 5}$$

where σ2 represents the standard deviation related to the transmission time, N represents the number of storage devices, $ETC_i$ represents the predicted transmission time of the ith storage device, and $\overline{ETC}$ represents an average value of transmission times of all the storage devices. It will be understood that the above Formulas 4 to 5 are only specific examples for determining the component of the global balance degree, which is related to transmission time.

According to an example implementation of the present disclosure, this component can be determined based on other formulas.

According to an example implementation of the present disclosure, the global balance degree function GE associated with each candidate backup destination can be determined based on the following Formula 6:

$$GE = \sigma1 * v1 + \sigma2 * v2 + v3 \qquad \text{Formula 6}$$

where v1 and v2 distributions represent custom weights, σ1 and σ2 are components determined according to the formulas described above, and v3 represents a custom offset value. It will be understood that Formula 6 here is only illustrative. According to an example implementation of the present disclosure, other formulas may also be used to determine the global balance degree function GE. For example, the global balance degree function GE can be determined based on the product of σ1 and σ2.

According to an example implementation of the present disclosure, the corresponding global balance degree function GE can be determined for multiple candidate backup destinations. The global balance degrees of the multiple candidate backup destinations can be ordered, and the candidate backup destination with the optimal global balance degree can be selected as the backup destination. According to an example implementation of the present disclosure, a threshold of the global balance degree can be specified, and it can be specified that candidate backup destinations higher than this threshold can be filtered out of the multiple candidate backup destinations. According to an example implementation of the present disclosure, this threshold can be set based on historical experience. According to an example implementation of the present disclosure, this threshold can be set based on the current state of each storage device.

It will be understood that the global balance degree here represents a difference between the usage of all the storage devices in the storage device set after a certain candidate backup destination is selected as the backup destination. The smaller the value of the global balance degree, the more helpful the selection of this candidate backup destination is to the usage balance of all the storage devices. With the example implementation of the present disclosure, it is possible to select, as much as possible, a candidate backup destination that is helpful to the usage balance of all the storage devices as the backup destination.

The method for performing the example implementations according to the present disclosure has been described above with reference to FIGS. 2 to 7. According to an example implementation of the present disclosure, an apparatus for selecting a backup destination for a backup task is provided. The apparatus includes: a device information receiving module configured to receive device information about storage devices in a storage device set, wherein the backup task is executed in the storage device set; a backup information receiving module configured to receive backup information about the backup task; an acquisition module configured to acquire a destination association relationship, wherein the destination association relationship describes an association relationship between a reference backup task in a reference storage device set and a reference backup destination of the reference backup task, the reference backup destination including a group of storage devices in a reference storage system; and a selection module configured to select a backup destination for the backup task from the storage device set according to the destination association relationship and based on the device information and the backup information, the backup destination including a group of storage devices in the storage device set. According to an example implementation of the present disclosure, this apparatus may further include modules for performing other steps in method 300 described above.

Figure 8:
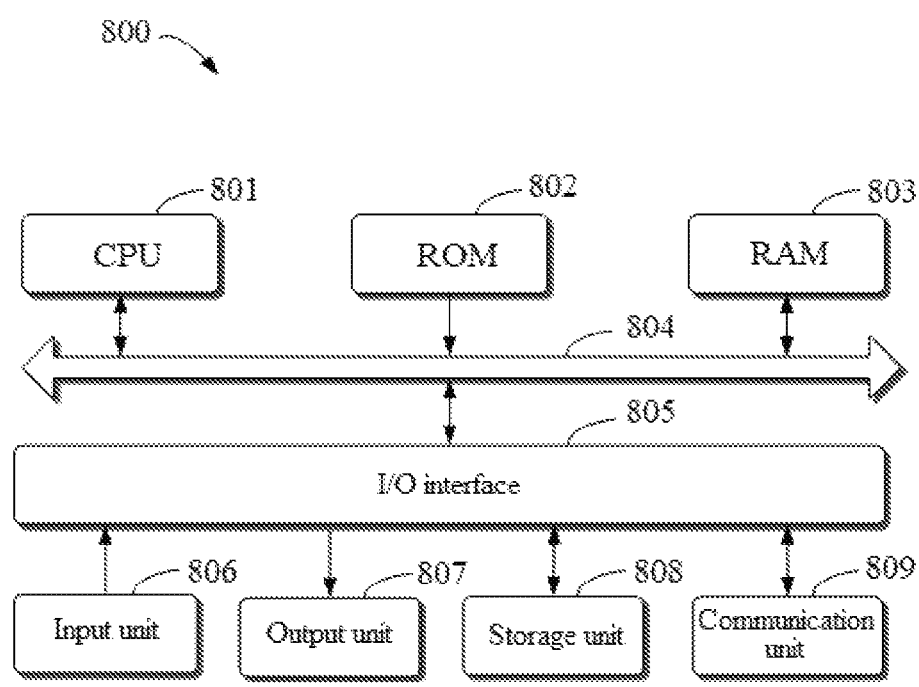
FIG. 8 schematically shows a block diagram of a device that can be used to implement the example implementations of the present disclosure.

FIG. 8 schematically shows a block diagram of device 800 that can be used to implement the example implementations of the present disclosure. According to an example implementation of the present disclosure, device 800 may be an electronic device, wherein example device 800 includes central processing unit (CPU) 801 that may perform various appropriate actions and processing according to computer program instructions stored in read-only memory device (ROM) 802 or computer program instructions loaded from storage unit 808 into random access memory device (RAM) 803. In RAM 803, various programs and data required for the operation of example device 800 may also be stored. CPU 801, ROM 802, and RAM 803 are connected to each other through bus 804. Input/output (I/O) interface 805 is also connected to bus 804.

Multiple components in example device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows example device 800 to exchange information/data with other devices through a computer network such as the Internet and/or various telecommunication networks.

The various processes and processing described above, such as example methods or example processes, may be performed by CPU 801. For example, according to an example implementation of the present disclosure, various example methods or example processes can be implemented as computer software programs, which are tangibly contained in a machine-readable medium, such as storage unit 808. According to an example implementation of the present disclosure, part or all of the computer program may be loaded and/or installed on example device 800 via ROM 802 and/or communication unit 809. When the computer program is loaded into RAM 803 and executed by CPU 801, one or more steps of the example method or example process described above may be executed.

According to an example implementation of the present disclosure, an electronic device is provided, including: at least one processor; and at least one memory storing computer program instructions, wherein the at least one memory and the computer program instructions are configured to cause, together with the at least one processor, the electronic device to perform an action for selecting a backup destination for a backup task. The action includes: receiving device information about storage devices in a storage device set, wherein the backup task is executed in the storage device set; receiving backup information about the backup task; acquiring a destination association relationship, wherein the destination association relationship describes an association relationship between a reference backup task in a reference storage device set and a reference backup destination of the reference backup task, the reference backup destination including a group of storage devices in a reference storage system; and selecting a backup destination for the backup task from the storage device set according to the destination association relationship and based on the device information and the backup information, the backup destination including a group of storage devices in the storage device set.

According to an example implementation of the present disclosure, receiving the device information and the backup information further includes: receiving the device information and the backup information that are within a preset time period.

According to an example implementation of the present disclosure, the device information includes at least any one of the following: a position of the storage device, an available storage space of the storage device, a network bandwidth of the storage device, a CPU usage rate of the storage device, a memory usage rate of the storage device, an exhaustion time of the storage device, and so on.

According to an example implementation of the present disclosure, the backup information includes at least any one of the following: the number of backup copies specified by the backup task; a size of source data specified by the backup task; and a repetition rate of the source data.

According to an example implementation of the present disclosure, acquiring the destination association relationship includes: determining reference backup information about each reference backup task executed in the reference storage device set; determining reference device information about each reference storage device in the reference storage device set; and training the destination association relationship based on the reference backup information, the reference device information, and the reference backup destination of the reference backup task.

According to an example implementation of the present disclosure, the destination association relationship includes: a first network model based on a convolutional neural network, wherein the first network model is used to map the reference backup information and the reference device information to an internal feature vector; and a second network model based on a long short-term memory network, wherein the second network model is used to map the internal feature vector to the reference backup destination of the reference backup task.

According to an example implementation of the present disclosure, determining the backup destination includes: mapping the backup information and the device information to an internal feature vector based on the first network model; and mapping the internal feature vector to the backup destination based on the second network model.

According to an example implementation of the present disclosure, determining the backup destination further includes verifying the backup destination in response to the backup destination satisfying the following conditions: a distance between any two storage devices in the group of storage devices included in the backup destination is greater than a threshold distance; an available resource amount of any storage device in the group of storage devices included in the backup destination is greater than a threshold resource amount; and a global balance degree associated with the backup destination is higher than a threshold balance degree, wherein the global balance degree indicates a usage balance degree of the storage device set in the situation where a storage device in the backup destination is used for the backup task.

According to an example implementation of the present disclosure, the storage device set and the reference storage device set satisfy at least any one of the following: having the same or similar numbers of storage devices; and having the same or similar device models.

According to the example implementation of the present disclosure, the number of copies specified by the backup task is not higher than the number of copies specified by reference backup task.

According to an example implementation of the present disclosure, a computer program product is provided, the computer program product being tangibly stored on a non-volatile computer-readable medium and including machine-executable instructions which, when executed, cause a machine to execute the methods described above.

According to an example implementation of the present disclosure, a computer-readable medium is provided, the medium including machine-executable instructions which, when executed, cause a machine to execute the methods described above.

Through the implementations of the present disclosure, the amount of computation for selecting a backup destination can be greatly reduced, thereby improving the automation level and performance of the storage system.

As used herein, the term "include" and similar terms thereof should be understood as open-ended inclusion, i.e., "including but not limited to." The term "based on" should be understood as "based at least in part on." The term "one implementation" or "this implementation" should be understood as "at least one implementation." The terms "first," "second," etc., may refer to different or the same objects. Other explicit and implicit definitions may also be included below.

As used herein, the term "determine" encompasses a variety of actions. For example, "determine" may include operating, computing, processing, exporting, surveying, searching (for example, searching in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the implementations of the present disclosure may be implemented by hardware, software, or a combination of software and hardware. The hardware part can be implemented using dedicated logic; the software part can be stored in a memory and executed by an appropriate instruction execution system, such as a microprocessor or dedicated design hardware. Those skilled in the art can understand that the above-mentioned devices and methods can be implemented by using computer-executable instructions and/or by being included in processor control code which, for example, is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flowchart can be changed. Additionally or alternatively, some steps may be omitted, multiple steps may be combined into one step for execution, and/or one step may be decomposed into multiple steps for execution. It should also be noted that the features and functions of two or more apparatuses according to the present disclosure may be embodied in one apparatus. On the contrary, the features and functions of one apparatus described above can be embodied by further dividing the apparatus into multiple apparatuses.

Although the present disclosure has been described with reference to several specific implementations, it should be understood that the present disclosure is not limited to the specific implementations disclosed. The present disclosure is intended to cover various modifications and equivalent arrangements included within the spirit and scope of the appended claims.

What is claimed is:

1. A method including:
   receiving device information about storage devices in a storage device set, wherein a backup task is executed in the storage device set;
   receiving backup information about the backup task;
   training a machine learning system to determine at least one network model characterizing a destination association relationship, wherein the destination association relationship describes an association relationship between a reference backup task in a reference storage device set and a reference backup destination of the reference backup task, the reference backup destination including a group of storage devices in a reference storage system;
   selecting a backup destination for the backup task from the storage device set according to the destination association relationship and based on the device information and the backup information, the backup destination including a group of storage devices in the storage device set; and
   executing the backup task utilizing the selected backup destination.

2. The method according to claim 1, wherein receiving the device information and the backup information further includes: receiving the device information and the backup information that are within a preset time period.

3. The method according to claim 1, wherein the device information includes, for each of one or more of the storage devices in the storage device set, at least any one of the following:
   a position of the storage device;
   an available storage space of the storage device;
   a network bandwidth of the storage device;
   a CPU usage rate of the storage device;
   a memory usage rate of the storage device; and
   an exhaustion time of the storage device.

4. The method according to claim 1, wherein the backup information includes at least any one of the following:
   a number of backup copies specified by the backup task;
   a size of source data specified by the backup task; and
   a repetition rate of the source data.

5. The method according to claim 1, wherein training the machine learning system to determine at least one network model characterizing the destination association relationship includes:
   determining reference backup information about the reference backup task executed in the reference storage device set;
   determining reference device information about each reference storage device in the reference storage device set; and
   training the destination association relationship based on the reference backup information, the reference device information, and the reference backup destination of the reference backup task.

6. The method according to claim 5, wherein the destination association relationship includes:
   a first network model based on a convolutional neural network, wherein the first network model is used to map the reference backup information and the reference device information to an internal feature vector; and
   a second network model based on a long short-term memory network, wherein the second network model is used to map the internal feature vector to the reference backup destination of the reference backup task.

7. The method according to claim 1, wherein determining the backup destination includes:
   mapping the backup information and the device information to an internal feature vector based on a first network model; and
   mapping the internal feature vector to the backup destination based on a second network model.

8. The method according to claim 1, wherein determining the backup destination further includes verifying the backup destination in response to the backup destination satisfying the following conditions:
   a distance between any two storage devices in the group of storage devices that are in the storage device set and included in the backup destination is greater than a threshold distance;
   an available resource amount of any storage device in the group of storage devices that are in the storage device set and included in the backup destination is greater than a threshold resource amount; and
   a global balance degree associated with the backup destination is higher than a threshold balance degree, wherein the global balance degree indicates a usage balance degree of the storage device set in a situation where a storage device in the backup destination is used for the backup task.

9. The method according to claim 1, wherein the storage device set and the reference storage device set satisfy at least any one of the following:
   having same or similar numbers of storage devices; and
   having same or similar device models.

10. The method according to claim 1, wherein a number of copies specified by the backup task is not higher than a number of copies specified by the reference backup task.

11. An electronic device, including:
    at least one processor; and
    at least one memory storing computer program instructions, wherein the at least one memory and the computer program instructions are configured to cause, together with the at least one processor, the electronic device to perform actions, the actions including:
    receiving device information about storage devices in a storage device set, wherein a backup task is executed in the storage device set;
    receiving backup information about the backup task;
    training a machine learning system to determine at least one network model characterizing a destination association relationship, wherein the destination association relationship describes an association relationship between a reference backup task in a reference storage device set and a reference backup destination of the reference backup task, the reference backup destination including a group of storage devices in a reference storage system;
    selecting a backup destination for the backup task from the storage device set according to the destination association relationship and based on the device information and the backup information, the backup destination including a group of storage devices in the storage device set; and
    executing the backup task utilizing the selected backup destination.

12. The device according to claim 11, wherein receiving the device information and the backup information further includes: receiving the device information and the backup information that are within a preset time period.

13. The device according to claim 11, wherein the device information includes, for each of one or more of the storage devices in the storage device set, at least any one of the following:
- a position of the storage device;
- an available storage space of the storage device;
- a network bandwidth of the storage device;
- a CPU usage rate of the storage device;
- a memory usage rate of the storage device; and
- an exhaustion time of the storage device.

14. The device according to claim 11, wherein the backup information includes at least any one of the following:
- a number of backup copies specified by the backup task;
- a size of source data specified by the backup task; and
- a repetition rate of the source data.

15. The device according to claim 11, wherein training the machine learning system to determine at least one network model characterizing the destination association relationship includes:
- determining reference backup information about the reference backup task executed in the reference storage device set;
- determining reference device information about each reference storage device in the reference storage device set; and
- training the destination association relationship based on the reference backup information, the reference device information, and the reference backup destination of the reference backup task.

16. The device according to claim 15, wherein the destination association relationship includes:
- a first network model based on a convolutional neural network, wherein the first network model is used to map the reference backup information and the reference device information to an internal feature vector; and
- a second network model based on a long short-term memory network, wherein the second network model is used to map the internal feature vector to the reference backup destination of the reference backup task.

17. The device according to claim 11, wherein determining the backup destination includes:
- mapping the backup information and the device information to an internal feature vector based on a first network model; and
- mapping the internal feature vector to the backup destination based on a second network model.

18. The device according to claim 11, wherein determining the backup destination further includes verifying the backup destination in response to the backup destination satisfying the following conditions:
- a distance between any two storage devices in the group of storage devices that are in the storage device set and included in the backup destination is greater than a threshold distance;
- an available resource amount of any storage device in the group of storage devices that are in the storage device set and included in the backup destination is greater than a threshold resource amount; and
- a global balance degree associated with the backup destination is higher than a threshold balance degree, wherein the global balance degree indicates a usage balance degree of the storage device set in a situation where a storage device in the backup destination is used for the backup task.

19. The device according to claim 11, wherein the storage device set and the reference storage device set satisfy at least any one of the following:
- having same or similar numbers of storage devices; and
- having same or similar device models;
- and further wherein a number of copies specified by the backup task is not higher than a number of copies specified by the reference backup task.

20. A computer program product tangibly stored on a non-volatile computer-readable medium and including machine-executable instructions, wherein the machine-executable instructions, when executed, cause a machine to perform steps of a method, the method including:
- receiving device information about storage devices in a storage device set, wherein a backup task is executed in the storage device set;
- receiving backup information about the backup task;
- training a machine learning system to determine at least one network model characterizing a destination association relationship, wherein the destination association relationship describes an association relationship between a reference backup task in a reference storage device set and a reference backup destination of the reference backup task, the reference backup destination including a group of storage devices in a reference storage system;
- selecting a backup destination for the backup task from the storage device set according to the destination association relationship and based on the device information and the backup information, the backup destination including a group of storage devices in the storage device set; and
- executing the backup task utilizing the selected backup destination.

* * * * *